May 26, 1959     W. H. NEWELL ET AL     2,888,203
DEVICE FOR PREDICTING VALUES OF A FLUCTUATING
SYSTEM AT A PREDETERMINED FUTURE TIME
Original Filed May 29, 1953     4 Sheets-Sheet 1

$(P_p + P_{-3p}) X + (P_o + P_{-2p}) Y + P_{-p} = \epsilon_1 \to 0$
$(P_o + P_{-4p}) X + (P_{-p} + P_{-3p}) Y + P_{-2p} = \epsilon_2 \to 0$
$(P_{-p} + P_{-5p}) X + (P_{-2p} + P_{-4p}) Y + P_{-3p} = \epsilon_3 \to 0$ INVENTORS
WILLIAM H. NEWELL
EDWARD G. BURGESS JR,
NORMAN J. ZABB
STAMATES I. FRANGOULIS

BY
ATTORNEY

INVENTORS
WILLIAM H. NEWELL
EDWARD G. BURGESS JR,
NORMAN J. ZABB
STAMATES I. FRANGOULIS
BY Victor A. Boret
ATTORNEY

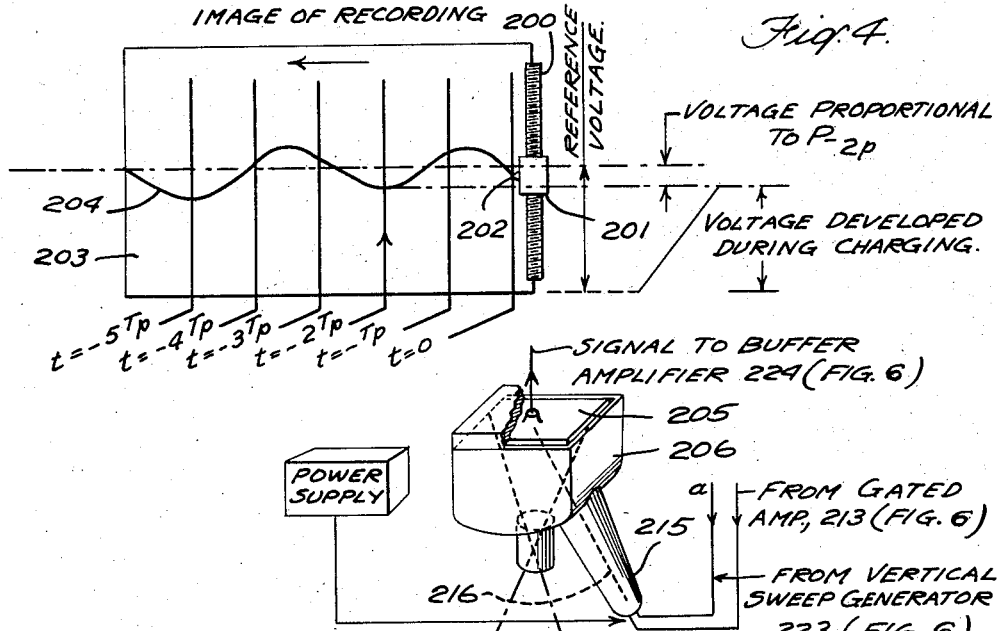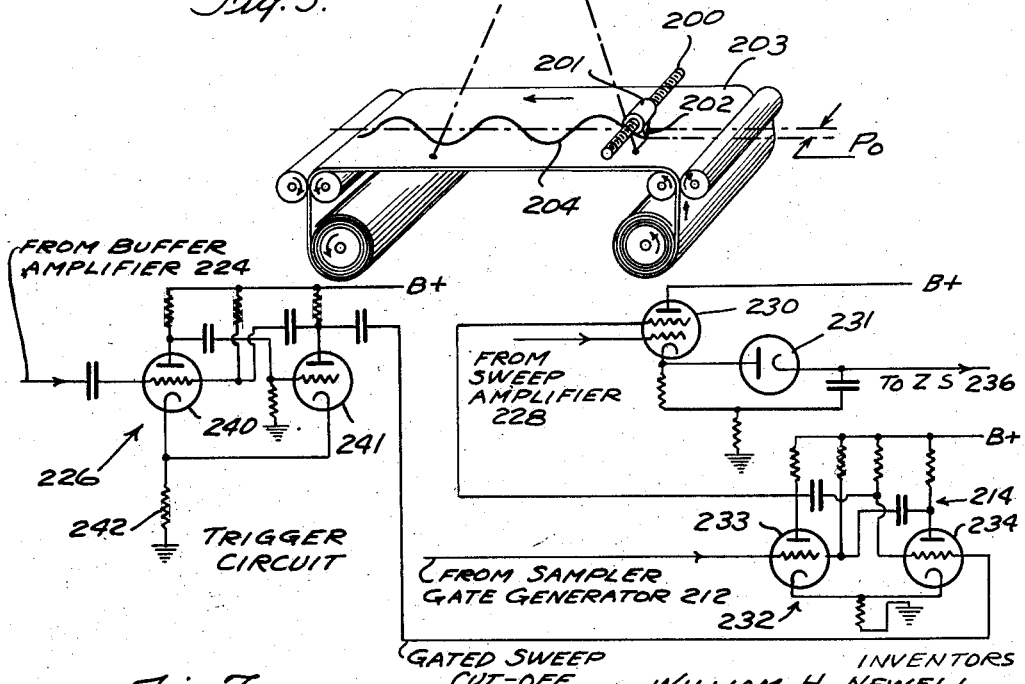

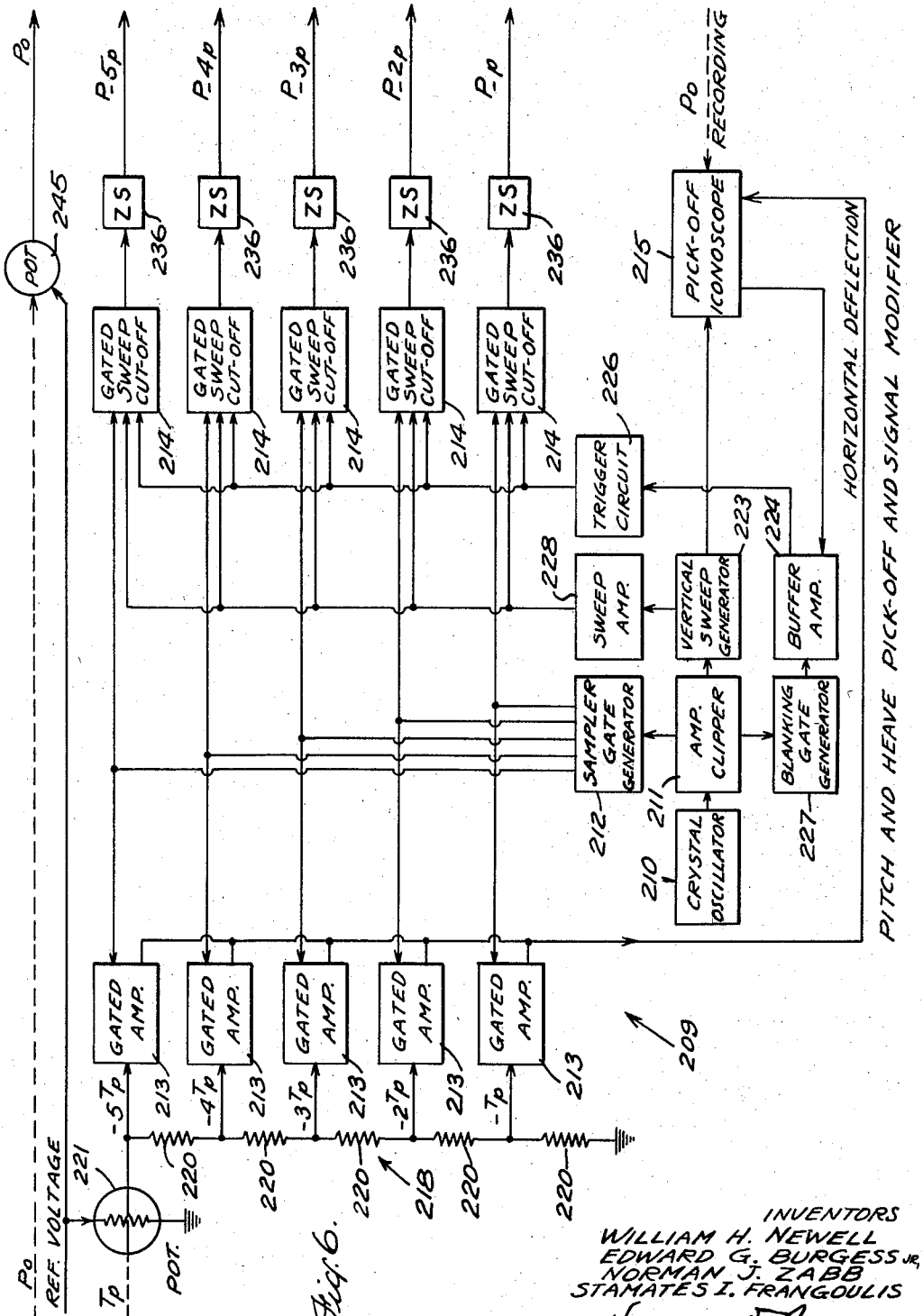

United States Patent Office 2,888,203
Patented May 26, 1959

2,888,203
DEVICE FOR PREDICTING VALUES OF A FLUCTUATING SYSTEM AT A PREDETERMINED FUTURE TIME

William H. Newell, Mount Vernon, Edward G. Burgess, Jr., Kew Gardens, Norman J. Zabb, Brooklyn, and Stamates I. Frangoulis, Flushing, N.Y., assignors to Sperry Rand Corporation, a corporation of Delaware Original application May 29, 1953, Serial No. 358,324. Divided and this application February 28, 1955, Serial No. 490,763

7 Claims. (Cl. 235—180)

The present application is a division of application Serial No. 358,324 filed May 29, 1953.

The present invention relates to a method and apparatus for computing the characteristics of a fluctuating system continuously for successive future periods, and although it has a wide range of utility, it is particularly useful in predicting the future pitch angle (deck tilt) and the future heave (level) at a future time of a floating platform, such as the flight deck of a carrier.

In guiding an airplane in its approach towards a floating platform, such as the deck of a carrier for landing, it is necessary to predict the time of landing and the pitch angle and heave of the deck at the predicted time, to assure safe landing. Since the carrier is continuously oscillating in pitch and has a continuous oscillating vertical movement during the approach of the airplane, it becomes necessary to compute continuously the characteristics of the fluctuating motions of the carrier and to predict therefrom the pitch and heave of the carrier at the future predicted time of landing. Since the movement of the deck does not follow a uniform mathematical pattern or equation, it is seen that the matter of determining with accuracy the pitch and heave at a future time is not a simple problem.

One object of the present invention is to provide a novel method and device by which the characteristics of a fluctuating system may be computed and predicted continuously for successive future periods, even though the form of the system may be continuously varying and the variations in the system may not be following continuously any predetermined mathematical pattern or equation.

Another object is to provide a novel method and device by which the future pitch angle of a floating platform, such as the flight deck of a carrier, at the expected future instant of landing can be computed and predicted.

A further object is to provide a novel method and device by which the future heave or flight deck level of a floating platform, such as that of a carrier, at the expected future instant of landing can be computed and predicted.

In accordance with the present invention, the value of a fluctuating system at a future predetermined time is determined by continuously determining a number of past values of said system spaced at predetermined intervals, and starting continuously from the present and from said past values determining the value of said system at said future time.

In its more specific aspects, the invention is employed for continuously predicting the pitch angle and heave of a floating platform at a future predetermined time, by determining a number of past values of pitch angles and of level spaced at predetermined intervals, and from said past values determining the pitch angle and level at said future time. The operation is continuous in that the future characteristics of the pitch angle and level fluctuations are calculated on the basis of past performances, and as the past values change and deviate from the calculated characteristics of the system, the future calculated characteristics are correspondingly changed.

Various other objects, features and advantages of the present invention are apparent from the following description and from the accompanying drawings, in which—

Figs. 1 and 2 conjointly show diagrammatically a pitch prediction computor embodying the present invention and employing past values of pitch angle as inputs, the solid lines indicating mechanical movements and the dotted lines indicating electrical signals;

Fig. 3 is a diagrammatic view of a follow-up unit employed to convert the signal voltages representing past values of pitch angle into shaft rotations proportional to these voltages, for use as inputs into the mechanism of Figs. 1 and 2, the electrical signals being indicated in dotted lines and the mechanical movements in full lines;

Fig. 4 is a diagram of the pitch angle curve recorded in accordance with the operation of a stable element and employed for obtaining past values of pitch angles and shows in conjunction therewith the output voltage for one pitch angle value obtained by a pitch pick-off and signal modifier shown in Figs. 5 and 6.

Fig. 5 shows diagrammatically the television pick-off device employed in conjunction with the pitch pick-off and signal modifier of Fig. 6;

Fig. 6 shows diagrammatically the pitch pick-off and signal modifier for obtaining past values of pitch angles in the form of electric signals, the full lines representing electric signals, the dotted lines mechanical movement such as shaft rotation; and Fig. 7 is a diagram of the trigger circuit and the gated sweep cut-off employed as part of the system of Fig. 6.

Figure 1:
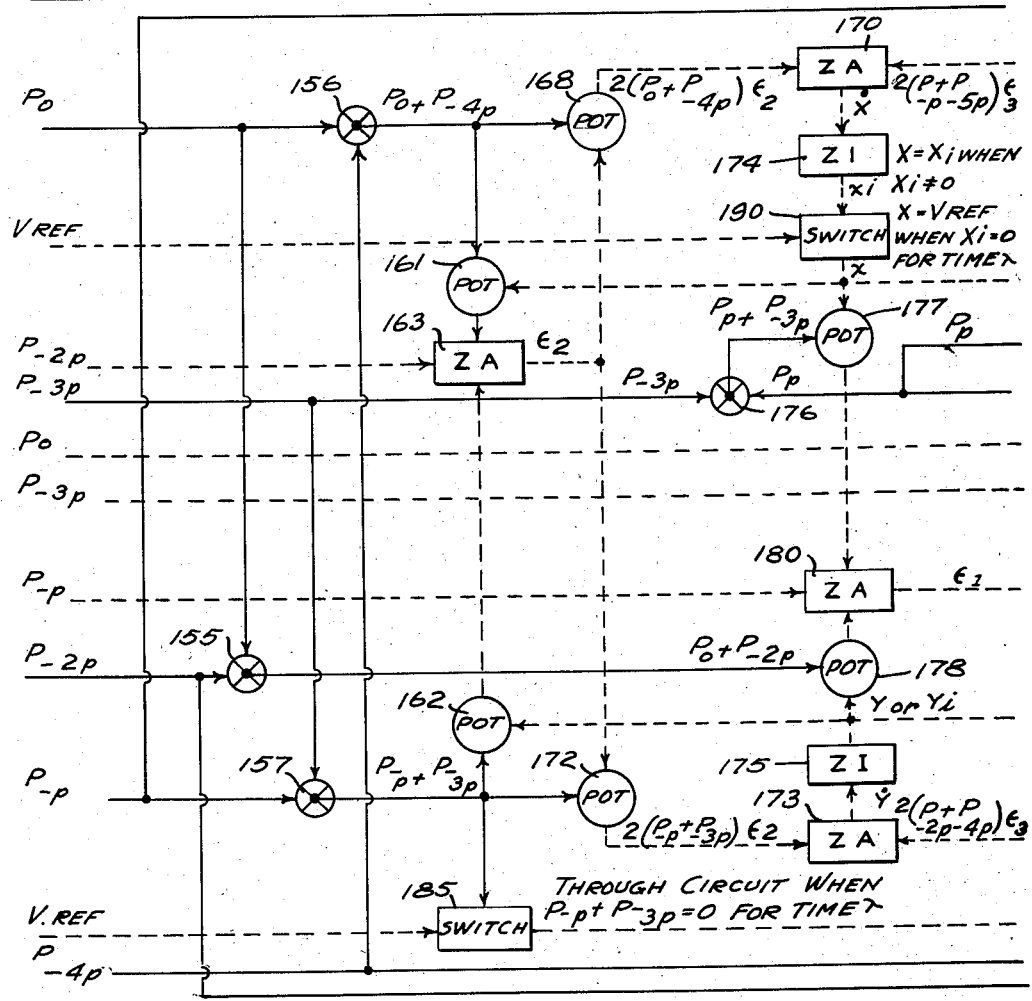

To predict the position of a ship's deck at the future instant of landing of an approaching plane, it is required that the time ahead when the plane is expected to land be predicted and then that the position of the deck at this time be predicted. This sequence of predictions is based on the assumption that the pilot has sole control of the plane speed and that the position of the deck at touchdown (the position on the deck where the plane can begin to land) is not preselected.

The time required by a plane to fly from its present position to its position at touchdown on the deck indicated herein by the symbol $T_p$ can be calculated in the manner described in the aforesaid copending application. For computing the predicted pitch angle of the deck at the predicted time $T_p$ of landing indicated by the symbol $P_p$ and the predicted deck height at the predicted time $T_p$ indicated by the symbol $H_p$, it is necessary to determine continuously the present pitch angle of the deck indicated by the symbol $P_0$ and the present deck height indicated by the symbol $H_0$.

To supply continuously information on the magnitude of the present ship pitch angle, service of a stable element is required. This stable element could be of any well known construction. For example, it could be one of the stable elements commonly employed in connection with firing control systems in warships, except that it would be provided with means for transmitting the pitch $P_o$ to a recorder from which the past values of the pitch angle at previously spaced intervals may be determined; as will be more fully described. There is also the possibility that the stabilizer unit required in connection with the radar antenna drive could also be used to supply continuously the information $P_o$ and from that information the past values of the pitch angles required could be obtained.

Continuous measurement and supply of the information $H_o$, i.e. the vertical motion of the ship, can be obtained and recorded from an accelerometer of the type shown and described in the aforesaid copending application, and from that information, the past values of the deck level could be obtained.

Having determined a value for the prediction time $T_p$, the second phase of the prediction problem is entered into, namely the deck tilt $P_p$ at the future time $T_p$. Consider first a ship at rest in still water. If now a moment should be applied about an athwartship axis through the center of gravity, some pitch angle, say $P$ would result. Upon removal of this applied moment, the ship would oscillate in pitch about the athwartship axis with decreasing amplitude, the equation of motion being approximately $$I\ddot{P}+C\dot{P}+KP=0 \qquad (18)$$

where $I$ is the effective longitudinal moment of inertia of the ship about the athwartship pitch axis, $C$ is the damping moment coefficient due to skin friction and the like, $K$ is the hydraulic restoring moment coefficient, $\ddot{P}$ is the second derivative of the pitch angle, with respect to time and $\dot{P}$ is the first derivative of the pitch angle with respect to time. Now the period of this oscillation is the pitching period of the ship and is equal to $$T=\frac{2\pi}{W_{np}}=\frac{2\pi}{\sqrt{\frac{K}{I}-\frac{C^2}{4I^2}}}$$

where $W_{np}$=natural angular frequency of pitch. However, when the ship is in a seaway, the equation of motion (18) becomes $$I\ddot{P}+C\dot{P}+KP=F(t)$$

where $F(t)$ represents the pitch component of the moment applied to the ship by wave action. Now from general observation, it can be said that $F(t)$, although highly variable, will nevertheless at a given hour exhibit a frequency spectrum in which certain narrow bands of frequencies are predominant. From an analyzed recording of pitch angle of various type ships headed into the wind under different sea conditions over extended periods of time, it would be possible to obtain the frequency spectrum of the ship's pitching motion under the conditions existing at the time of the run. From this data, it would be noted that the frequencies of greatest amplitude would correspond to the natural pitch period of the ship, the periods at which the ship is encountering the particular wave systems running at the time, the period of ship roll and the period of heave. The last two periods mentioned would probably be of small import and are included only because of the fact that both rolling and heaving cause an induced pitch. Usually, but not always, there will be a single system of waves running. Furthermore, this system of waves will more often than not be running in nearly the same direction as the wind. Hence, the normal expectation during carrier landing operations is that the ship would be headed in a direction about opposite to that in which the waves are traveling. Considering that the usual period of ocean waves is in the range of 5 to 10 seconds, a ship speed of 25 knots would reduce these periods to the range of 1.8 to 5.5 seconds. It almost seems from these considerations that under such conditions, the only period to be seriously considered in pitch motion would be the natural pitch period. That is, a forcing moment function of 2 second period would have to be of tremendous magnitude to appreciably affect the ship motion in pitch. However, a forcing function of 5 second period might well have an appreciable effect, and of course a longer period forcing function would have still greater influence. Functions having such longer periods would arise if the normal conditions outlined above did not hold—as for example, when the wind is opposite in direction to the sea and the ship is traveling with a following sea.

From the above discussion, it is evident that an exact solution for the equation of motion of the ship is not possible. However, the equation of motion may be represented with sufficient accuracy by the approximation $$I\ddot{P}+K\dot{P}+F(t)=a\sin(wt+\phi)$$

where $F(t)$ is a sine function of unknown amplitude $a$, angular frequency $w$ and phase angle $\phi$. The solution of this differential equation is then of the form $$P=a_1\sin(w_1t+\phi_1)+a_2\sin(w_2t+\phi_2) \qquad (20)$$

$w_1$ and $w_2$ being the unknown angular velocities and $\phi_1$ and $\phi_2$ the phase angles of the simple harmonic motions of which the pitch angle is assumed to be composed. This form, involving the six unknown parameters $a_1$, $a_2$, $w_1$, $w_2$, $\phi_1$ and $\phi_2$ therefore represents the time variations of pitch angle. Hence, if these six unknowns and variable parameters can be continuously determined and furthermore if a continuous value of prediction time $T_p$ is available, then the predicted pitch angle is $$P_p=a_1\sin[w_1(t+T_p)+\phi_1]+a_2\sin[w_2(t+T_p)+\phi_2] \qquad (21)$$

The problem is now therefore reduced to the continuous determination of the six unknown and variable parameters noted above.

In the form of mechanism which can be employed in accordance with the present invention to determine the predicted pitch angle $P_p$, it is assumed in Equation 20 that $a_1=a$ and $a_2=0$, so that $$P=a\sin(wt+\phi) \qquad (22)$$

Considered here as known quantities are the present value of pitch angle $P$ as well as the rates of change $\dot{P}$, $\ddot{P}$, etc. Furthermore, if means are provided for recording $P$, the values of $P$ and its rates at any past instant of time will be known. From this known data, the quantities $a$, $w$ and $\phi$ which are for the present considered to be constants, must be determined. Now this evalution may be carried out in accordance with the present invention, as follows:

Let us again consider the simple expression of Equation 22 for pitch angle $$P=a\sin(wt+\phi) \qquad (22)$$

For a series of equally spaced time intervals $\tau$ in the past, namely, at $t-\tau$, $t-2\tau$, ... $t-n\tau$, this Equation 22 may be written as follows:

$$P_{-\tau}=a\sin[w(t-\tau)+\phi]$$
$$P_{-2\tau}=a\sin[w(t-2_\tau)+\phi]$$

etc. Rewriting these in exponential form, we have the series of equations.

$$\begin{cases} P=-\frac{ia}{2}e^{i(wt+\phi)}\cdot 1 + \frac{ia}{2}e^{-i(wt+\phi)}\cdot 1 \\ P_{-\tau}=-\frac{ia}{2}e^{i(wt+\phi)}\cdot e^{-iw\tau}+\frac{ia}{2}e^{-i(wt+\phi)}\cdot e^{iw\tau} \\ P_{-2\tau}=-\frac{ia}{2}e^{i(wt+\phi)}\cdot e^{-2iw\tau}+\frac{ia}{2}e^{-i(wt+\phi)}\cdot e^{2iw\tau} \\ \text{etc.} \end{cases} \qquad (29)$$

From any three of these equations, we may eliminate the quantities $$+\frac{ia}{2}e^{i(wt+\phi)}$$

and $$-\frac{ia}{2}e^{i(wt+\phi)}$$

thereby obtaining a series of third order determinants equated to zero. For example, the first of these is $$\begin{vmatrix} P & 1 & 1 \\ P_{-\tau} & e^{-iw\tau} & e^{iw\tau} \\ P_{-2\tau} & e^{-2iw\tau} & e^{2iw\tau} \end{vmatrix} = 0$$

Now let $x = e^{iw}$, so that the above determinant becomes $$\begin{vmatrix} P & 1 & 1 \\ P_{-\tau} & x^{-1} & x \\ P_{-2\tau} & x^{-2} & x^2 \end{vmatrix} = 0$$

or $$\begin{vmatrix} P & x^2 & 1 \\ P_{-\tau} & x & x \\ P_{-2\tau} & 1 & x^2 \end{vmatrix} = 0$$

Operating on this form, we obtain after successive reductions $$\begin{vmatrix} P+P_{-2\tau}, & x^2+1 \\ P_{-\tau}, & x \end{vmatrix} = 0$$

That is
$$(P+P_{-2\tau})x - P_{-\tau}(x^2+1) = 0 \quad (30)$$

Similarly
$$(P_{-\tau}+P_{-3\tau})x - P_{-2\tau}(x^2+1) = 0$$

will be the relation derived from the set composed of the second, third and fourth equations in the set (29). The fact that the pair of Equations 30 must be consistent, requires that for a pure sine variation, the measured values of pitch angles at the equal spaced time intervals $t-3\tau$, $t-2\tau$, $t-\tau$ and $t$ satisfy the relation $$\begin{vmatrix} P+P_{-2\tau}, & P_{-\tau} \\ P_{-\tau}+P_{-3\tau}, & P_{-2\tau} \end{vmatrix} = 0 \quad (31)$$

Suppose now that we make the time interval $\tau$ equal to the prediction time $T_p$ and write $P_{-n\tau} = P_{-nT_p} = P_{-np}$. Then we may obtain the following relation similar to Equation 31

$$\begin{vmatrix} P_p+P_{-p}, & P \\ P+P_{-2p}, & P_{-p} \end{vmatrix} = 0 \quad (32)$$

Thus, if we know from a recording of pitch angle, the magnitude of this angle at the present time and at the past time intervals $-T_p$, $-2T_p$, then we can determine the magnitude of the pitch angle at the future time $T_p$ from the Relation 32, which is a linear equation in $P_p$ of the form $$bP_p + c = 0$$

where $b$ and $c$ are in general the variable coefficients, $$b = P_{-p}$$
$$c = P^2_{-p} - P^2 - PP_{-2p}$$

It should be noted that this solution for the predicted pitch angle in terms of past values of the pitch angle at prescribed times does not involve the direct determination of $a$ or $w$ or $\phi$, so that these quantities remain as unknown parameters.

The above analysis may be extended to handle a pitch angle variation of the form of Equation 20, which is $$P = a_1 \sin(w_1 t + \phi_1) + a_2 \sin(w_2 t + \phi_2)$$

To carry this out, the first series of equations is written $$P_p = -\frac{ia_1}{2}e^{i(w_1 t+\phi_1)} \cdot e^{iw_1 T_p} + \frac{ia_1}{2}e^{-i(w_1 t+\phi_1)} \cdot e^{-iw_1 T_p}$$
$$-\frac{ia_2}{2}e^{i(w_2 t+\phi_2)} \cdot e^{-iw_2 T_p} + \frac{ia_2}{2}e^{-i(w_2 t+\phi_2)} \cdot e^{-iw_2 T_p}$$

$$P = -\frac{ia_1}{2}e^{i(w_1 t+\phi_1)} + \frac{ia_1}{2}e^{-i(w_1 t+\phi_1)}$$
$$-\frac{ia_2}{2}e^{i(w_2 t+\phi_2)} + \frac{ia_2}{2}e^{-i(w_2 t+\phi_2)}$$

$$P_{-p} = -\frac{ia_1}{2}e^{i(w_1 t+\phi_1)} \cdot e^{-iw_1 T_p} + \frac{ia_1}{2}e^{-i(w_1 t+\phi_1)} \cdot e^{iw_1 T_p}$$
$$-\frac{ia_2}{2}e^{i(w_2 t+\phi_2)} \cdot e^{-iw_2 T_p} + \frac{ia_2}{2}e^{-i(w_2 t+\phi_2)} \cdot e^{iw_2 T_p}$$

$$P_{-2p} = -\frac{ia_1}{2}e^{i(w_1 t+\phi_1)} \cdot e^{-2iw_1 T_p} + \frac{ia_1}{2}e^{-i(w_1 t+\phi_1)} \cdot e^{2iw_1 T_p}$$
$$-\frac{ia_2}{2}e^{i(w_2 t+\phi_2)} \cdot e^{-2iw_2 T_p} + \frac{ia_2}{2}e^{-i(w_2 t+\phi_2)} \cdot e^{2iw_2 T_p} \quad (33)$$

From the first five of the equations in the set (33), we can eliminate the four quantities $$+\frac{ia_1}{2}e^{i(w_1 t+\phi_1)}, \quad -\frac{ia_1}{2}e^{-i(w_1 t+\phi_1)}$$
$$+\frac{ia_2}{2}e^{i(w_2 t+\phi_2)}, \quad -\frac{ia_2}{2}e^{-i(w_2 t+\phi_2)}$$

The result of this elimination written in determinant form is $$\begin{vmatrix} P_p & e^{iw_1 T_p} & e^{-iw_1 T_p} & e^{iw_2 T_p} & e^{-iw_2 T_p} \\ P & 1 & 1 & 1 & 1 \\ P_{-p} & e^{-iw_1 T_p} & e^{iw_1 T_p} & e^{-iw_2 T_p} & e^{iw_2 T_p} \\ P_{-2p} & e^{-2iw_1 T_p} & e^{2iw_1 T_p} & e^{-2iw_2 T_p} & e^{2iw_2 T_p} \\ P_{-3p} & e^{-3iw_1 T_p} & e^{3iw_1 T_p} & e^{-3iw_2 T_p} & e^{3iw_2 T_p} \end{vmatrix} = 0$$

(34)

Now let $e^{iw_1 T_p} = x$ and $e^{iw_2 T_p} = y$, then the determinant (34) may be written $$\begin{vmatrix} P_p & x & x^{-1} & y & y^{-1} \\ P & 1 & 1 & 1 & 1 \\ P_{-p} & x^{-1} & x & y^{-1} & y \\ P_{-2p} & x^{-2} & x^2 & y^{-2} & y^2 \\ P_{-3p} & x^{-3} & x^3 & y^{-3} & y^3 \end{vmatrix} = 0$$

and this is equivalent to $$\begin{vmatrix} P_p & x^4 & 1 & y^4 & 1 \\ P & x^3 & x & y^3 & y \\ P_{-p} & x^2 & x^2 & y^2 & y^2 \\ P_{-2p} & x & x^3 & y & y^3 \\ P_{-3p} & 1 & x^4 & 1 & y^4 \end{vmatrix} = 0 \quad (35)$$

We may in like manner obtain four other determinants similar in form to (35) of which the first one is $$\begin{vmatrix} P & x^4 & 1 & y^4 & 1 \\ P_{-p} & x^3 & x & y^3 & y \\ P_{-2p} & x^2 & x^2 & y^2 & y^2 \\ P_{-3p} & x & x^3 & y & y^3 \\ P_{-4p} & 1 & x^4 & 1 & y^4 \end{vmatrix}$$

Now these five determinants are such that the minors of corresponding elements in the first column of each are equal, so that we have in effect five linear equations in five unknowns, namely, the first minors of the elements in the first column. The condition that these five equations be consistent, gives then the relation $$\begin{vmatrix} P_p & P & P_{-p} & P_{-2p} & P_{-3p} \\ P & P_{-p} & P_{-2p} & P_{-3p} & P_{-4p} \\ P_{-p} & P_{-2p} & P_{-3p} & P_{-4p} & P_{-5p} \\ P_{-2p} & P_{-3p} & P_{-4p} & P_{-5p} & P_{-6p} \\ P_{-3p} & P_{-4p} & P_{-5p} & P_{-6p} & P_{-7p} \end{vmatrix} = 0 \quad (36)$$

This relation is actually a linear equation of the form $bP_p + c = 0$, in which the variable coefficients $b$ and $c$ are known in terms of past values of the pitch angle. It should be noted that the number of such pitch angle measurements required to determine $P_p$ is here equal to eight which is two more than the number of parameters involved in the expression for P. It is therefore expected that the Relation 36 can in some manner be reduced. That this is actually the case may be shown in the following manner. Returning to the relation of Equation 35, this is equivalent to $$\begin{vmatrix} P_p & x^4-1 & 0 & y^4-1 & 1 \\ P & x^3-x & x-y & y^3-y & y \\ P_{-p} & 0 & x^2-y^2 & 0 & y^2 \\ P_{-2p} & x-x^3 & x^3-y^3 & y-y^3 & y^3 \\ P_{-3p} & 1-x^4 & x^4-y^4 & 1-y^4 & y^4 \end{vmatrix} = 0$$

By a sequence of reductions, this becomes $$\begin{vmatrix} P_{-p} & x+y & y^2 \\ P+P_{-2p} & 1+x^2+xy+y^2 & y(y^2+1) \\ P_p+P_{-3p} & (x+y)(x^2+y^2) & y^4+1 \end{vmatrix} (x^2-1)(y^2-1)(x-y)^2(1-xy) = 0$$

This relation in turn is equivalent to the linear equation $$(P_p+P_{-3p})xy - (P+P_{-2p})(x+y)(xy+1) + P_{-p}[(xy+1)^2+x^2+y^2] = 0$$

Similarly $$(P+P_{-4p})xy - (P_{-p}+P_{-3p})(x+y)(xy+1) + P_{-2p}[(xy+1)^2+x^2+y^2] = 0$$

and $$(P_{-p}+P_{-5p})xy - (P_{-2p}+P_{-4p})(x+y)(xy+1) + P_{-3p}[xy+1)^2+x^2+y^2] = 0$$

(37)

Since the set of Equations 37 must be consistent, it follows that $$\begin{vmatrix} P_p+P_{-3p}, & P+P_{-2p}, & P_{-p} \\ P+P_{-4p} & P_{-p}+P_{-3p}, & P_{-2p} \\ P_{-p}+P_{-5p} & P_{-2p}+P_{-4p} & P_{-3p} \end{vmatrix} = 0 \quad (38)$$

This relation can be mechanized for the determination of the pitch prediction $P_p$, in the manner to be described.

The quantity P in the Relation 38 is the quantity $P_o$, the present pitch angle, which is available as a shaft rotation from the stable element, as already described. The quantities $P_{-p}, P_{-2p} \ldots P_{-5p}$ giving past values of pitch angle at the respective times $-T_p, -2T_p \ldots -5T_p$, or represented as $-p, -2p \ldots$ etc., are available as voltages proportional to them by a mechanism to be described and shown in Figures 4, 5 and 6. The Relation 38 with the substituted notations indicated is equivalent to the set of three simultaneous linear equations $$(P_p+P_{-3p})X + (P_o+P_{-2p})Y + P_{-p} = 0 \quad (39)$$

$$(P_o+P_{-4p})X + (P_{-p}+P_{-3p})Y + P_{-2p} = 0 \quad (40)$$

$$(P_{-p}+P_{-5p})X + (P_{-2p}+P_{-4p})Y + P_{-3p} = 0 \quad (41)$$

Where X and Y are functions of the unknown angular velocities $w_1$ and $w_2$ of the harmonic motions of which the pitch angle is assumed to be composed. The general method of solution adopted is first to determine X and Y from the second and third Equations 40 and 41. These values may next be substituted in the first Equation 39 which can then be solved for the desired quantity $P_p$. Since it is desired to solve Equations 40 and 41 by means of feed-back, as will be described, we must determine the necessary conditions for this process to be stable. This is equivalent arithmetically speaking, to determining an iteration process for approximating X and Y which is convergent to their true values. Suppose initially that Equations 40 and 41 are not satisfied, so that we may write them $$(P_o+P_{-4p})X + (P_{-p}+P_{-3p})Y + P_{-2p} = \epsilon_2 \text{(error signal)} \quad (42)$$

$$(P_{-p}+P_{-5p})X + (P_{-2p}+P_{-4p})Y + P_{-3p} = \epsilon_3 \text{(error signal)} \quad (43)$$

We then form the expression $$\mu = \epsilon_2^2 + \epsilon_3^2 \quad (44)$$

If now we can arrange the mechanism so that the rate of change of $\mu$ is never positive and not equal to zero unless $\epsilon_2$ and $\epsilon_3$ are zero, then since $\mu$ is always positive from (44), the limit of $\mu$ as time increases must be zero and hence the limits of $\epsilon_2$ and $\epsilon_3$ must also be zero. We have for the time rate of change of $\mu$ the expression $$\frac{d\mu}{dt} = \frac{\partial \mu}{\partial X}\cdot\frac{dX}{dt} + \frac{\partial \mu}{\partial Y}\cdot\frac{dY}{dt} \quad (45)$$

Suppose in Equation 45, we let $$\frac{dX}{dt} = \frac{-k_1\partial\mu}{\partial X}$$

and $$\frac{dY}{dt} = \frac{-k_2\partial\mu}{\partial Y} \quad (46)$$

where $k_1$ and $k_2$ are positive constants. Then $$\frac{d\mu}{dt} = -k_1\left(\frac{\partial\mu}{\partial X}\right)^2 - k_2\left(\frac{\partial\mu}{\partial Y}\right)^2 \quad (47)$$

a quantity which is always negative or zero. The partial derivative $$\frac{\partial\mu}{\partial X}$$

is obtained after substituting into Equation 44 the values of $\epsilon_2$ and $\epsilon_3$ given by Equations 42 and 43, so that $$\mu = [(P_o+P_{-4p})X + (P_{-p}+P_{-3p})Y + P_{-2p}]^2 + [(P_{-p}+P_{-5p})X + (P_{-2p}+P_{-4p})Y + P_{-3p}]^2$$

and $$\frac{\partial\mu}{\partial X} = 2(P_o+P_{-4p})[(P_o+P_{-4p})X + (P_{-p}+P_{-3p})Y + P_{-2p}] + 2(P_{-p}+P_{-5p})[(P_{-p}+P_{-5p})X + (P_{-2p}+P_{-4p})Y + P_{-3p}]$$

or $$\frac{\partial \mu}{\partial X} = 2(P_o + P_{-4p})\epsilon_2 + 2(P_{-p} + P_{-5p})\epsilon_3$$

Similarly $$\frac{\partial \mu}{\partial Y} = 2(P_{-p} + P_{-3p})\epsilon_2 + 2(P_{-2p} + P_{-4p})\epsilon_3$$

These expressions for the partial derivatives are substituted in Equations 46, resulting in $$\frac{dX}{dt} = -2k_1[(P_o + P_{-4p})\epsilon_2 + (P_{-p} + P_{-5p})\epsilon_3] \quad (48)$$

and $$\frac{dY}{dt} = -2k_2[(P_{-p} + P_{-3p})\epsilon_2 + (P_{-2p} + P_{-4p})\epsilon_3] \quad (49)$$

or $$X = X_o - 2k_1 \int_0^t [(P_o + P_{-4p})\epsilon_2 + (P_{-p} + P_{-5p})\epsilon_3]dt$$

and $$Y = Y_o - 2k_2 \int_0^t [(P_{-p} + P_{-3p})\epsilon_2 + (P_{-2p} + P_{-4p})\epsilon_3]dt$$

It is apparent that in the mechanism, an appropriate linear combination of the error signals $\epsilon_2$ and $\epsilon_3$ must be formed before feeding these quantities back into the mechanism to adjust the magnitudes of X and Y in such a manner that they converge to the correct values, obtained when $\epsilon_2$ and $\epsilon_3$ are both zero.

In the above analysis, it was assumed that the various coefficients, such as $P_o + P_{-2p}$ were constant. Actually, these quantities will go thru a cycle of sinusoidal variation in about ten seconds. Hence, the quantity $$\frac{d\mu}{dt}$$

must be large in comparison with the rate of change of any of the coefficients. It can be shown that Equation 47 may be replaced by the inequality $$\frac{d\mu}{dt} < -C\mu$$

where C is a positive constant or $$\frac{d\mu}{dt} = -C\mu \quad (50)$$

in which $\frac{d\mu}{dt}$ has the absolute value.

Integration of Equation 50 gives $$\mu = \mu_0 e^{-Ct}$$

Here, the constant C may be made as large as desired by increasing the sensitivity constants $k_1$ and $k_2$. As a result, the settling time can be made short enough so that X and Y follow their values corresponding to the changing set of coefficients.

Special conditions would arise when $w_1 = w_2$. In such a case, Equations 40 and 41 are not independent and their formal solution would give indeterminate values for X and Y. However, the mechanism to be described, as constructed will still give some pair of values for X and Y which satisfy Equations 40 and 41 and there will be a singly infinite set of such solution pairs. Hence, we shall have for any value of X $$Y = -\frac{P_{-2p} + (P_o + P_{-4p})X}{(P_{-p} + P_{-3p})}$$

If now this value of Y is substituted in Equation 39, the result is equivalent to $$[(P_p + P_{-3p})(P_{-p} + P_{-3p}) - (P_o + P_{-2p})(P_o + P_{-4p})]X$$

$$+ P_{-p}(P_{-p} + P_{-3p}) - P_{-2p}(P_o + P_{-2p}) = 0$$

But for $w_1 = w_2$, we have the relations $$\begin{vmatrix} P_p & +P_{-p}, & P_o \\ P_o & +P_{-2p}, & P_{-p} \\ P_{-p} & +P_{-3p}, & P_{-2p} \\ P_{-2p} & +P_{-4p}, & P_{-3p} \end{vmatrix} = 0 \quad (51)$$

Hence $$P_{-p}(P_{-p} + P_{-3p}) - P_{-2p}(P_o + P_{-2p}) = 0$$

Accordingly $$[(P_p + P_{-3p})(P_{-p} + P_{-3p}) - (P_o + P_{-2p})(P_o + P_{-4p})]X = 0$$

and therefore $P_p$ is independent of X. However, no solution is given by the mechanism if $X = 0$. When $X \neq 0$ we obtain $$P_p = \frac{(P_o + P_{-p})(P_o + P_{-4p})}{(P_{-p} + P_{-3p})} - P_{-3p}$$

or $$P_p = \frac{(P_o^2 + P_o P_{-2p} - P_{-p}^2) + (P_o P_{-2p} + P_o P_{-4p} - P_p P_{-3p})}{(P_{-p} + P_{-3p})} \quad (52)$$

in accordance with Relation 51. The solution given by Equation 52 is satisfactory if $P_{-p} + P_{-3p} \neq 0$.

Therefore, there is obtained for $w_1 = w_2$, the correct value of $P_p$ independently of the particular value of X, so long as $X \neq 0$ and $P_{-p} + P_{-3p} \neq 0$. We have now two conditions to consider. In the first condition, we may have $X = 0$ instantaneously due to the temporary vanishing of the determinant $$\begin{vmatrix} P_{-p} + P_{-3p} & P_{-2p} \\ P_{-2p} + P_{-4p} & P_{-3p} \end{vmatrix}$$

when $w_1 \neq w_2$. This event will not disturb the continuity of the solution for $P_p$. In the second condition, however, X might conceivably remain on zero for an appreciable time. This is possible only when $w_1 = w_2$ and X is indeterminate. Thus we make provision here by means of a time delay relay operating when $X = 0$ for time $\tau$ to ensure that X has an arbitrary non-zero value. A similar situation exists in regard to the quantity $(P_{-p} + P_{-3p})$. Thus $P_{-p} + P_{-3p}$ will remain on zero for an appreciable time only if $w_1 = w_2 = 0$. If $P_{-p} + P_{-3p} = 0$ for an appreciable time, it indicates that there is no pitch motion and hence $P_p = P_o$, in which case a time delay relay is employed to take care of this situation.

The mechanism 144 for solving equations $$(P_p + P_{-3p})X + (P_o + P_{-2p})Y + P_{-p} = \epsilon_1 \to 0 \quad (39a)$$

$$(P_o + P_{-4p})X + (P_{-p} + P_{-3p})Y + P_{-2p} = \epsilon_2 \to 0 \quad (40a)$$

$$(P_{-p} + P_{-5p})X + (P_{-2p} + P_{-4p})Y + P_{-3p} = \epsilon_3 \to 0 \quad (41a)$$

equivalent to Equations 39, 40 and 41 is illustrated in Figures 1, 2 and 3. In this illustration, the mechanical movements such as shaft rotations, are indicated in full lines and the electrical signals such as voltage signals are indicated in dotted lines.

The pitch prediction computer 144 illustrated in Figures 1 and 2 requires as inputs besides the present pitch angle $P_o$, the past pitch angles $P_{-p}$, $P_{-2p}$, $P_{-3p}$, $P_{-4p}$ and $P_{-5p}$ as shaft rotations. These past pitch values $P_{-kp}$ are obtained as voltage signals as shown in Figures 4, 5 and 6, in a manner to be described, and are then converted into shaft rotations proportional to these voltages by a servo follow-up control unit 145 shown in Figure 3, for introduction into the pitch prediction computer of Figures 1 and 2. This follow-up unit 145 is similar to the follow-up unit employed in the heave meter shown in the aforesaid copending application, for converting the amplified output voltage of the signal generator into a shaft rotation, and for that purpose employs an adding network 146 constituting the servo control and an amplifier 147 for the output signal from the adding network. A potentiometer 148 supplies the matching voltage and a generator 150 supplies anticipation to prevent oscillation of a servo motor 151 while following a variable signal.

Having now obtained all the necessary quantities $P_{-kp}$, and having available $P_o$ as the shaft rotational output of the stable element, we add these quantities by the mechanical differentials 155, 156, 157, 158 and 160 (Figures 1 and 2) to obtain the coefficients $$P_o+P_{-2p}$$
$$P_o+P_{-4p}$$
$$P_{-p}+P_{-3p}$$
$$P_{-p}+P_{-5p}$$
$$P_{-2p}+P_{-4p}$$

respectively, in Equations 39a, 40a and 41a.

The next step is to obtain voltages proportional to the terms in the three Equations 39a, 40a and 41a. For example, the term $(P_o+P_{-4p})X$ for Equation 40a is required as voltage. As indicated in Figure 1, this voltage is the output of a potentiometer 161 whose inputs are X, constituting the feedback voltage on the winding, and $P_o+P_{-4p}$, the mechanical setting of the potentiometer slider, derived from the mechanical differential 156. Similarly, the term $(P_{-p}+P_{-3p})Y$ for Equation 40a is obtained as the output of a potentiometer 162, whose inputs are the feedback voltage Y and the value $P_{-p}+P_{-3p}$ derived from the mechanical differential 157. The three voltages $(P_o+P_{-4p})X$, $(P_{-p}+P_{-3p})Y$ and $P_{-2p}$ (original signal without conversion into shaft rotation) are now added in a network 163 to obtain as output the error signal $\epsilon_2$ which is zero when the Equation 40a is satisfied.

In a similar manner, through the potentiometers 164 and 165, we obtain voltage signals $(P_{-p}+P_{-5p})X$ and $(P_{-2p}+P_{-4p})Y$, and these are combined in the network 166 with the original signal $P_{-3p}$ (without conversion into shaft rotation) to obtain as output the error signal $\epsilon_3$, which is zero when the Equation 41a is satisfied.

In the method of solution here adopted, the error signals $\epsilon_2$ and $\epsilon_3$ must be combined in definite linear combination for each feedback, in order to secure stability of operation, as previously shown. These linear combinations are given in Equations 48 and 49. Thus the voltage $\epsilon_2$ is applied to the winding of a potentiometer 168, whose slider input is $P_o+P_{-4p}$, a power driven rotation, to obtain the output voltage $2(P_o+P_{-4p})\epsilon_2$. Likewise, the voltage $2(P_{-p}+P_{-5p})\epsilon_3$ is obtained as the output of a potentiometer 169. These two voltages are added in the adding network 170 to obtain the output $$\frac{dX}{dt}=\dot{X}=-2k_1[(P_o+P_{-4p})\epsilon_2+(P_{-p}+P_{-5p})\epsilon_3]$$

in accordance with the theory of stability previously developed and indicated by Equation 48.

Similarly, through a potentiometer 171, an output is obtained therefrom having the magnitude $$2(P_{-2p}+P_{-4p})\epsilon_3$$

and through a potentiometer 172, an output is obtained therefrom having the magnitude $2(P_{-p}+P_{-3p})\epsilon_2$. These two voltages are added in the adding network 173 in accordance with Equation 49 to obtain $$\frac{dY}{dt}=\dot{Y}=-2k_2[(P_{-p}+P_{-3p})\epsilon_2+(P_{-2p}+P_{-4p})\epsilon_3]$$

The voltages $\dot{X}$ and $\dot{Y}$ are then fed to the integrating networks 174 and 175 respectively to obtain output voltage $X_1$ proportional to voltage X from one network and voltage $Y_1$ proportional to voltage Y from the other network. As long as $X_i \neq 0$, $X_i = X$.

Having the voltages X and Y, we now deal with Equation 39a to obtain the desired pitch prediction $P_p$. For that purpose, we add the quantities $P_{-3p}$ and $P_p$ (output of computer) in a mechanical differential 176 to obtain the quantity $P_p+P_{-3p}$ which is imposed on a potentiometer 177 in conjunction with the voltage X to obtain the voltage quantity $(P_p+P_{-3p})X$. Similarly, the quantity $P_o+P_{-2p}$ from the differential 155 and the voltage Y are imposed on the potentiometer 178 to obtain the voltage $(P_o+P_{-2p})Y$. The voltages $(P_p+P_{-3p})X$ and $$(P_o+P_{-2p})Y$$

and the quantity $P_{-p}$ employed in its original voltage form without conversion into shaft rotation, are added in a network 180 to obtain the error signal $\epsilon_1$ in accordance with Equation 39a. To obtain stability of feed back for this single Equation 39a, we must have according to the original analysis $$P_pX+P_{-3p}X+(P_o+P_{-2p})Y+P_{-p}=\epsilon_1$$

equivalent to Equation 39a.

$$\mu=\epsilon_1^2$$

$$\frac{d\mu}{dt}=\frac{\delta\mu}{\delta P_p}\cdot\frac{dP_p}{dt}=-k\left(\frac{\delta\mu}{\delta P_p}\right)^2$$

$$\frac{\delta\mu}{\delta P_p}=2X\epsilon_1$$

$$\dot{P}_p=-2kX\epsilon_1$$

$$P_p=-2k\int_0^t X\epsilon_1 dt \tag{54}$$

Hence, by multiplying the error signal $\epsilon_1$ by the quantity X and integrating the product, there is obtained the feedback $P_p$. The settling time can be made sufficiently small by increasing the sensitivity factor k.

To obtain the quantity $P_p$ in the final stages of the computer in accordance with the Equation 54, the voltage X is converted into a corresponding shaft rotation by a follow-up unit 181, similar to that illustrated in Figure 3, and this shaft rotation and the error voltage signal $\epsilon_1$ are supplied to a potentiometer 182 to obtain the quantity $\dot{P}_p$ which after integration in the network 183 results in the value $P_p$ as a voltage. This voltage $P_p$ is converted into corresponding shaft rotation before being sent out of the computer, by a follow-up unit 184 similar to the follow-up unit of Figure 3.

As already indicated, there are two conditions that must be provided for to assure continuous operation of the computer. Those conditions are when $X=0$ for an appreciable time $\tau$ and when $P_{-p}+P_{-3p}=0$ for a time $\tau$ which may amount to about 0.1 of a second. For that purpose, there is provided a time delay relay unit 185 having one mechanical element operated by the mechanical quantity $P_{-p}+P_{-3p}$ and having a lead from a voltage reference source connecting through a switch in said unit into a line connecting into a relay unit 186 located between the integrating network 183 and the follow-up unit 184. When the quantity $P_{-p}+P_{-3p}$ equals zero, indicating there is no pitch motion and that therefore $P_p=P_o$, this condition imposed on the time delay relay unit 185, will cause a switch to close in said unit, so that the reference voltage actuates a relay in the unit 186 and closes thereby a circuit from a signal line carrying a voltage signal $P_o$ to the outlet of said unit and in turn to the output of the computer, while the connection in said unit 186 from the outlet of the integrating network 183 to the inlet of the follow-up unit 184 is opened. As soon as normal conditions are restored in which $P_{-p}+P_{-3p}\neq 0$, the switch in the unit 185 establishing a circuit between the voltage reference line and the unit 186 is opened, so that the $P_p$ signal from the output of the integrating network 183 has a through circuit through said unit 186 to the follow-up unit 184, while the circuit of the voltage signal $P_o$ is opened.

To provide for the condition when $X=0$, for the time $\tau$, there is provided a time delay relay unit 190 between the integrating network 174 and the potentiometer 177. When $X_i=0$, a relay in the unit 190 closes a switch therein to establish connection between a voltage reference signal line and the output of said unit, while the circuit between the output of the integrating network 174 and the output of said unit is opened. At that instant, $X=V$ ref. When $X_1$ is no longer equal to zero, the circuit between the voltage reference signal line and the output of the relay unit 190 is opened, while the through circuit between the output of the integrating network 174 and the output of the relay unit 190 is reestablished.

In the pitch prediction computer of Figures 1 and 2, the past values of pitch angle at the respective times $-T_p$, $-2T_p$ ... $-5T_p$ were employed as inputs, some in the form of voltages and others in the form of shaft rotations. Before such quantities are obtained, a recording of the pitch angle $P_o$ in the form of a black single line curve on a white background is made. This recording is made from the output of the stable element in any suitable manner, as for example in the manner shown in Figure 4. For example, the stable element is made to rotate a screw 200 in accordance with the variation in pitch angle with time. This screw 200 has threaded thereon a sleeve 201 carrying a pen 202 registering on a roll 203 moving lengthwise at a predetermined constant rate to produce an undulating record 204 which is a measure of the pitch angle of the carrier deck. In accordance with one method of the present invention, the quantities $P_{-p}$, $P_{-2p}$ ... $P_{-5p}$ representing the amplitudes of the record 204 are picked off at corresponding times $-T_p$, $-2T_p$, etc. and translated into voltages. For that purpose, the past record 204 is continuously focused as shown in Figure 5 on the screen 205 of a television pickup camera 206. This past record should cover the range from $t=0$ to $t=-5T_p$ where $T_p$ has some maximum value, say 30 seconds, as shown in Figure 4. Accordingly, the horizontal displacement of the camera scanning beam will represent time while the vertical displacement will represent amplitude or the magnitude of $P_{-t}$. Therefore, the scanning beam deflection coil circuit is arranged to obtain a single vertical sweep at horizontal deflections corresponding to the times $-T_p$, $-2T_p$, $-3T_p$, $-4T_p$ and $-5T_p$ in succession. If now, a charging circuit is triggered at the start of the vertical sweep and is opened by means of the pulse occurring when the vertical sweep beam crosses the curve image, there is obtained a voltage which, when diminished by a reference voltage, will be proportional to the amplitude of pitch at the time required. This arrangement is illustrated in Figure 4 for the vertical sweep at $t=-2T_p$.

The complete scanning cycle, consisting of the five vertical sweeps might be carried out hundreds of times per second, so that the five output voltages representing $P_{-kp}$ would after appropriate smoothing be quite continuous and suitable for transformation to mechanical rotations for use in connection with the pitch prediction computer of Figures 1 and 2. The devices necessary to carry out the operations indicated are shown in Figures 5, 6 and 7. In Figure 6, the solid lines represent electric signals and the dotted lines mechanical displacements, and specifically shaft rotations.

Referring specifically to Figure 6, the pitch pickoff and signal modifier system 209 shown comprises a crystal or oscillator 210 of well-known type, which is the primary source for the timing of all the operations and steps of the system. The oscillating rate of the crystal oscillator 210 is not important from the point of view of actual time measurements, since a submultiple of rate is employed in the system to control the sequences of operation at predetermined time intervals. The frequency of oscillation of the crystal oscillator 210 may be in the neighborhood of 100 kilocycles and this may be reduced to possible 5 kc. by frequency division, to give for example 1000 complete cycles of operation of the system per second.

The output of the crystal oscillator 210 is a sinusoidal voltage of predetermined frequency, as for example 5 kc. frequency. This voltage is applied to the control grid of a multi-grid high-gain tube in an amplifier clipper 211 of standard construction to amplify the signal from the crystal oscillator and at the same time clip off the crests of the sine wave voltages to produce a square wave voltage more suitable for the timing and synchronizing of the different operations of the system.

The output from the amplifier clipper 211 is imposed upon a sampler gate generator 212 which has connections to five circuits, each adapted to produce an electrical signal corresponding to one of the past values of pitch angle desired. This sampler gate generator 212 is essentially a combination of five multi-vibrators, one for each circuit and supplies during each complete cycle of operation, five pulses in succession, one to each of the separate circuits. Each of these impulses serves to close a connection (by rendering a tube conductive) through a gated amplifier 213 and a gated sweep cut-off 214, in one of the five circuits corresponding to the phase of the impulse. The sampler gate generator 212 and the five gated generators 213 serve thereby essentially as an electronic commutator.

Each of the gated amplifiers 213 is of standard well known construction and consists essentially of a tube with two grids, the screen grid being connected to the sampler gate generator 212, the control grid being connected to a voltage proportional to $-nT_p$. The gated amplifiers 213 are normally non-conducting. When an impulse is received by a gated amplifier 213 from the sampler gate generator 212, said gated amplifier becomes conducting and an impulse is sent thereby proportional in voltage to $-nT_p$ to a pick-off iconoscope 215 (Figures 6 and 7). This positions an electron beam 216 in said iconoscope in the horizontal or time direction. The beam is then in position to scan vertically across the image of the curve 204 (Figures 4 and 5) projected upon the iconoscope mosaic 205.

Each gated amplifier 213 has two inputs, one from the sampler gate generator 212, as described and the other from a voltage divider 218 comprising a series of resistances 220, arranged to divide an incoming voltage which is proportional to $-5T_p$ and to allocate to each of the five gated amplifiers 213 a voltage proportional to the value of $-nT_p$ selected for the circuit of that amplifier. The input voltage into the system is obtained from a shaft rotation (dotted lines) representing $T_p$ obtained from the prediction time computer shown and disclosed in said copending application. This shaft rotation is made the input of a linear potentiometer 221 (Figure 7) having a certain constant reference voltage applied to its total resistance. The output voltage of the potentiometer is therefore proportional to $-5T_p$, and this voltage is applied to the terminal of the voltage divider 218 having the five fixed resistances 220 between taps. In this manner, voltages proportional to $-5T_p$, $-4T_p$, $-3T_p$, $-2T_p$ and $-T_p$ are obtained as inputs to the control grids of the gated amplifiers 213.

When a gated amplifier 213 becomes conducting as the result of an impulse received from the sampler gate generator 212, as already described, the voltage passing through said gated amplifier proportional to $-nT_p$ is impressed upon the pick-off iconoscope 215, and this deflects its electron beam 216 horizontally to the abscissa value corresponding to the $-nT_p$ value of the image to be scanned. The extent of horizontal deflection of the electron scanning beam 216 is dependent upon the voltages impressed and is controlled from the crystal oscillator 210 through the amplifier clipper 211, as will be described, and since these voltages are proportional to the values $-nT_p$, the location of the scanning beam in its proper horizontal position is assured.

As soon as the electron scanning beam 216 from the iconoscope 215 has been properly located horizontally, an impulse is sent from the oscillator controlled amplifier clipper 211 to a vertical sweep generator 223, and this initiates the vertical sweep of the electron beam 213 along the selected $-nT_p$ abscissa value.

The vertical sweep generator 223 is of standard well known construction and includes a charging condenser. As the electron beam 216 moves vertically the condenser is charged at a voltage which ordinarily is exponential in character but which is linearized by means of a bootstrap circuit, so that the characteristics of this voltage during the vertical sweep are as indicated in Figure 4. As the electron beam 216 in its vertical sweep crosses the image being scanned, an impulse or pip is sent from the iconoscope 215 to a buffer amplifier 224 of well-known construction, to amplify the impulse and also to isolate the iconoscope 215 from a trigger circuit 226.

The electron beam 216 continues its vertical sweep beyond the crossing point of the image being scanned to a predetermined point and then returns vertically but more quickly towards its original position for the next horizontal sweep sequence. During this return trace, the electron beam 216 recrosses the image being scanned, and may send another impulse from the iconoscope 215 towards the buffer-amplifier 224. To prevent this condition, a blanking gate generator 227 is provided controlled from the oscillator 210 through the amplifier clipper 211 and serving to impose a blanking voltage to the buffer amplifier 224 during vertical return trace or fly-back time.

The trigger circuit 226 serves to freeze or clamp the voltage developed during charging in the vertical sweep generator 223 to the value it had when the electron beam 216 crossed the image being scanned. This voltage while it is building up in the vertical sweep generator 223 during the vertical sweep of the electron beam 216 is amplified in a sweep amplifier 228 and then impressed upon one of the gated sweep cut-offs 214 in the $-nT_p$ circuit.

Each gated sweep cut-off 214 (Figures 6 and 7) comprises a gated amplifier 230 connected to a diode circuit 231 and having its screen grid connected to a bistable trigger circuit 232 incorporated as part of said cut-off, and its control grid connected to the output of the sweep amplifier 228. One of the triode tubes 233 of the trigger circuit 232 has its grid connected to the output of the sampler gate generator 212 and is conductive in stable condition of the trigger circuit, while the other triode tube 234 of said trigger circuit has its grid connected to the output of the trigger circuit 226 and is non-conductive in stable condition of the trigger circuit 232. As soon as a gated amplifier 213 is rendered conductive by an impulse from a corresponding multi-vibrator unit in the sampler gate generator 212, this impulse is sent at the same time to the corresponding gated sweep cut-off 214 and through the conducting triode tube 233 in the trigger circuit 232 of said cut-off, as a positive impulse upon the screen grid of the gated amplifier 230. When the voltage is impressed upon the control grid of a gated amplifier 230 by an impulse from the sweep amplifier 228 generated when the electron scanning beam 216 starts its vertical scanning sweep, the gated amplifier 230 in the cut-off 214 becomes conductive, so that a linearly increasing voltage is conducted through said gated amplifier and through the diode circuit 231. When the electron scanning beam 216 during its vertical sweep crosses the image, the resulting impulse from the buffer amplifier 224 impressed upon the trigger circuit 226 causes said circuit to send out a negative impulse to the grid of the triode tube 234 in the trigger circuit 232 of the gated sweep cut-off 214, and causes thereby the tube 233 of said trigger circuit 232 to become non-conductive and the other tube 234 to become conductive. The resulting negative impulse impressed upon the screen grid of the gated amplifier 230 of the cut-off 214 renders said amplifier non-conductive, so that the charging voltage in the diode circuit 231 which has been increasing is clamped at the value it had upon the image crossing. The difference between this clamped voltage and a reference voltage is available at the outlet of the diode circuit 231 and this output value which is proportional to $P_{-np}$ as indicated in Figure 4 is smoothed by a network 236 of the type disclosed in the aforesaid copending application, so that a continuous value of $P_{-np}$ is obtained.

The trigger circuit 226 shown in Figure 7 is monostable and comprises a triode 240 and a triode 241 having a common cathode resistor 242, so that when triode 240 is conducting, triode 241 is cut off. During normal conditions, the trigger circuit 226 is in stable condition, i.e. the tube 240 is conducting and the tube 241 is not conducting, and no impulse is being sent from the trigger circuit 226 to the gated sweep cut-off 214. When a negative impulse is received from the buffer amplifier 224 as a result of the electron beam 216 crossing the image being scanned, it is amplified by the tube 240 and applied as a positive impulse to the grid of the tube 241. This causes the voltage on grid of the tube 240 to assume negative value, cutting-off tube 240 while tube 241 starts conducting. The output of the trigger circuit 226 to the gated sweep cut-off 214 also assumes a negative value and this serves to freeze or clamp the charging voltage to the value dependent upon the curve image cross-over point of the electron beam 216 as described.

Although the five $P_{-np}$ circuits are activated successively through the sequential impulses sent out from the sampler gate generator 212 successively to said circuits, the voltage quantities $P_{-5p}$, $P_{-4p}$, $P_{-3p}$, $P_{-2p}$, and $P_{-p}$ are continuously and simultaneously obtained and these are made available to the pitch prediction computer shown in Figures 1 and 3, after being converted into corresponding shaft rotations by follow-up units such as shown in Figure 3.

The present pitch angle $P_0$ which is obtained as a shaft rotation from the output of the stable element is made available as a voltage signal for use in connection with the switch 186 in the pitch prediction computer of Figure 1, by applying the present pitch angle $P_0$ as a slider displacement to potentiometer 245 (Figure 6) and at the same time applying a reference voltage to said potentiometer. The output of this potentiometer 245 will be an electric signal.

It is possible to modify the Relation 38, so that it is not necessary to take observations of P so far back in the past. For example, we may write $$P_{(k+q)T_p} + P_{(k-q)T_p} = a_i \sin(w_1[t+(k+q)T_p]+\phi_1)$$
$$+ a_2 \sin(w_2[t+(k+q)T_p]+\phi_2)$$
$$+ a_1 \sin(w_1[t+(k-q)T_p]+\phi_1)$$
$$+ a_2 \sin(w_2[t+(k-q)T_p]+\phi_2)$$

and using the formula for the sum of the sines of two angles $$P_{(k+q)T_p} + P_{(k-q)T_p} = 2a_1 \sin[w_1(t+kT_p)+\phi_1] \cos qw_1T_p + 2a_2 \sin[w_2(t+kT_p)+\phi_2] \cos qw_2T_p \quad (56)$$

Similarly $$P_{(k+m)T_p} + P_{(k-m)T_p} = 2a_1 \sin[w_1(t+kT_p)+\phi_1] \cos mw_1T_p + 2a_2 \sin[w_2(t+kT_p)+\phi_2] \cos mw_2T_p \quad (57)$$

$$P_{(k+n)T_p} + P_{(k-n)T_p} = 2a_1 \sin[w_1(t+kT_p)+\phi_1] \cos nw_1T_p + 2a_2 \sin[w_2(t+kT_p)+\phi_2] \cos nw_2T_p \quad (58)$$

In these Equations $k$, $q$, $m$ and $n$ are constant multipliers for the prediction time intervals The two quantities $-2a_1 \sin[w_1(t+kT_p)+\phi_1]$ and $-2a_2 \sin[w_2(t+kT_p)+\phi_2]$ may be eliminated from the three Equations 56, 57, and 58 to produce the relation $$\begin{vmatrix} P_{(k+q)T_p} + P_{(k-q)T_p}, & \cos qw_1T_p, & \cos qw_2T_p \\ P_{(k+m)T_p} + P_{(k-m)T_p}, & \cos mw_1T_p, & \cos mw_2T_p \\ P_{(k+n)T_p} + P_{(k-n)T_p}, & \cos nw_1T_p, & \cos nw_2T_p \end{vmatrix} = 0 \quad (59)$$

Two relations similar to 59 can be obtained by replacing $k$ by $k'$ and $k''$.

Thus a generalization of the Equation 38 is obtained by eliminating the expressions involving $w_1$ and $w_2$ from the Relation 59 and the two similar relations. The result is finally $$\begin{vmatrix} P_{(k+q)T_p} + P_{(k-q)T_p}, & P_{(k+m)T_p} + P_{(k-m)T_p}, & P_{(k+n)T_p} + P_{(k-n)T_p} \\ P_{(k'+q)T_p} + P_{(k'-q)T_p}, & P_{(k'+m)T_p} + P_{(k'-m)T_p}, & P_{(k'+n)T_p} + P_{(k'-n)T_p} \\ P_{(k''+q)T_p} + P_{(k''-q)T_p}, & P_{(k''+m)T_p} + P_{(k''-m)T_p}, & P_{(k''+n)T_p} + P_{(k''-n)T_p} \end{vmatrix} = 0 \quad (60)$$

Relation 38 is the special case of 60 with $$k=-1 \qquad q=+2$$
$$k'=-2 \qquad m=+1$$
$$k''=-3 \qquad n=0$$

It is apparent that we must have $$k'' < k' < k < 0$$

since if $k=0$, then $P_q$ or $P_{-q}$ and $P_m$ or $P_{-m}$ are both unknown future values of P whereas only one future value of P is desired and can be determined from the Relation 60 alone. We also have the simple relations $$k+q=1 \qquad\qquad q-m=1$$
$$k+m=0 \quad \text{or} \quad k-k'=1$$
$$k'+q=0$$

If, for example, $k=-\tfrac{1}{2}$ then $q=\tfrac{3}{2}$, $m=\tfrac{1}{2}$, $k'=-\tfrac{3}{2}$. In addition, we might take $n=0$, $k''=-2$ and let $T_p$ be represented by $p$, so that the Relation 60 becomes $$\begin{vmatrix} P_p + P_{-2p}, & P_p + P_{-p}, & 2P_{-\frac{1}{2}p} \\ P_o + P_{-3p}, & P_{-p} + P_{-2p}, & 2P_{-\frac{3}{2}p} \\ P_{-\frac{1}{2}p} + P_{-\frac{7}{2}p}, & P_{-\frac{3}{2}p} + P_{-\frac{5}{2}p}, & 2P_{-2p} \end{vmatrix} = 0 \quad (61)$$

It should be noted that observations are required at the past intervals given by $-\tfrac{1}{2}T_p$, $-T_p$, $-\tfrac{3}{2}T_p$, $-2T_p$, $-\tfrac{5}{2}T_p$, $-3T_p$ and $-\tfrac{7}{2}T_p$ as well as the present, making eight observations in all. This number is two more than the minimum number of observations required as indicated by the 6 parameters involved. Using the Relation 61, the time interval required for past sampling is reduced from $-5T_p$ to $-\tfrac{7}{2}T_p$ or by 30 percent.

Another such relation requiring nine observations is $$\begin{vmatrix} P_p + P_{-\frac{3}{4}p}, & P_o + P_{-\frac{1}{2}p}, & P_{-\frac{1}{4}p} \\ P_o + P_{-\frac{5}{4}p}, & P_{-p} + P_{-\frac{3}{4}p}, & P_{-\frac{3}{4}p} \\ P_{-\frac{1}{4}} + P_{-1\frac{1}{4}p}, & P_{-\frac{3}{4}p} + P_{-\frac{7}{4}p}, & P_{-\frac{3}{2}p} \end{vmatrix} = 0$$

and here the reduction in time interval is 45 percent.

The means for obtaining the values of pitch angle in the past at the special intervals indicated is similar to that shown in Figures 4–7, and the mechanism for predicting the pitch angle $P_p$ from these past quantities would be similar to that shown in Figures 13 and 14.

Equations 39a, 40a and 41a may be mechanized by the mechanisms of Figures 1–7, to determine the value of $H_p$ (predicted deck height at predicted time $T_p$ of landing) exactly as was the value $P_p$ (predicted pitch angle of the carrier at the predicted time $T_p$). In that case Equations 39a, 40a and 41a become $$(H_p+H_{-3p})X+(H_o+H_{-2p})Y+H_{-p}=\epsilon_1 \rightarrow 0 \quad (39b)$$

$$(H_o+H_{-4p})X+(H_{-p}+H_{-3p})Y+H_{-2p}=\epsilon_2 \rightarrow 0 \quad (40b)$$

$$(H_{-p}+H_{-5p})X+(H_{-2p}+H_{-4p})Y+H_{-3p}=\epsilon_3 \rightarrow 0 \quad (41b)$$

wherein $H_{-p}$, $H_{-2p}$, $H_{-3p}$, $H_{-4p}$ and $H_{-5p}$ represent past deck heights spaced at predetermined time intervals, $P_0$ represents the present deck height and X and Y are functions of the unknown angular velocities of the simple harmonic motions of which the fluctuating system of deck height variations is assumed to be composed.

In the mechanization of Equations 39b, 40b and 41b to obtain the value of $H_p$, a recording of the present deck height $H_0$ is made from the output of the heavemeter (accelerator) shown and described in the aforesaid copending application. From the resulting record produced in a manner similar to that shown in Figure 4, the quantities $H_{-p}$, $H_{-2p}$ ... $P_{-5p}$ representing the amplitudes of this record are picked off at corresponding times $-T_p$, $-2T_p$, etc. and translated into corresponding voltages by mechanisms similar to those shown in Figures 5–7. These voltage quantities $H_{-p}$, $H_{-2p}$ ... $P_{-5p}$ converted into corresponding shaft rotations by a servo follow-up control unit similar to that shown in Figure 3 are fed into the mechanism similar to that shown in Figures 1 and 2, to mechanize Equations 39b, 40b and 41b for the value of the quantity $H_p$.

The mechanisms shown and described may be set up as part of a system for guiding an airplane in its approach towards the flight deck of a carrier, as shown and described in the aforesaid copending application. However, as far as certain aspects of the invention are concerned, the method and mechanism of the present invention may be employed for continuously predicting the future value of a quantity in a fluctuating system, by continuously determining the past values of the quantity at spaced predetermined time intervals, and employing these past values as inputs to determine the future characteristics of a fluctuating system from which the value of the quantity at a predetermined future time is computed.

In the following claims the symbols $T_p$, $P$, $P_{-p}$, $P_{-2p}$, $P_{-3p}$, $P_{-4p}$, $P_{-5p}$ and $P_p$ have the general meanings indicated with application generally to fluctuating systems, unless specifically defined.

What is claimed is:

1. A device for determining the value $P_p$ of a quantity in a fluctuating system at a future predetermined time, which comprises means for receiving as input quantities a number of past values $P_{-p}$, $P_{-2p}$, $P_{-3p}$, $P_{-4p}$ and $P_{-5p}$ spaced at predetermined intervals, means for receiving as another input quantity the present value $P_0$ of said system and means for mechanizing with said input quantities the equations $$(P_p+P_{-3p})X+(P_o+P_{-2p})Y+P_{-p}=0$$

$$(P_o+P_{-4p})X+(P_{-p}+P_{-3p})Y+P_{-2p}=0$$

$$(P_{-p}+P_{-5p})X+(P_{-2p}+P_{-4p})Y+P_{-3p}=0$$

in which X and Y are functions of the unkown angular velocities of the simple harmonic motions of which the fluctuating system is assumed to be composed, to obtain the value $P_p$, the quantities X and Y being obtained by mechanizing two of said equations, and said quantities X and Y so obtained, being employed in mechanizing the other equation to obtain the quantity $P_p$.

2. A device for determining the value $P_p$ of a quantity in a fluctuating system at a future predetermined time as described in claim 1, comprising means for substituting in the mechanizing means for the determined quantity X a reference quantity when $X=0$, until conditions are restored in which X is no longer equal to zero.

3. A device for determining the value $P_p$ of a quantity in a fluctuating system at a future time as described in claim 1, comprising means for substituting in the mechanizing means for the determined quantity $P_p$ the quantity $P_o$, when the quantity $P_{-p}+P_{-3p}=0$, until conditions are restored in which the quantity $P_{-p}+P_{-3p}$ is no longer equal to zero.

4. A device for determining the value $P_p$ of a quantity in a flutuating system at a predetermined future time, which comprises means for receiving as input quantities a number of past values $P_{-p}$, $P_{-2p}$, $P_{-3p}$, $P_{-4p}$ and $P_{-5p}$ spaced at predetermined intervals, means for receiving as another input quantity the present value $P_o$ of said system, means responsive to said input quantities for mechanizing the equations $$(P_o+P_{-4p})X+(P_{-p}+P_{-3p})Y+P_{-2p}=\epsilon_2 \to 0$$
$$(P_{-p}+P_{-5})X+(P_{-2p}+P_{-4p})Y+P_{-3p}=\epsilon_3 \to 0$$

in which X and Y are functions of the unknown angular velocities of the simple harmonic motions of which the fluctuating system is assumed to be composed, and $\epsilon_2$ and $\epsilon_3$ are error signals, to obtain the values of $\epsilon_2$ and $\epsilon_3$, means for mechanizing with the determined values $\epsilon_2$ and $\epsilon_3$ the equations $$\frac{dX}{dt}=-2k_1[(P_o+P_{-4p})\epsilon_2+(P_{-p}+P_{-5p})\epsilon_3]$$

$$\frac{dy}{dt}=-2k_2[(P_{-p}+P_{-3p})\epsilon_2+(P_{-2p}+P_{-4p})\epsilon_3]$$

to obtain the values of X and Y, means for mechanizing with the determined values X and Y the equation $$(P_p+P_{-3p})X+(P_o+P_{-2p})Y+P_{-p}=\epsilon_1 \to 0$$

wherein $\epsilon_1$ is an error signal, to obtain the value of said error signal $\epsilon_1$, and means for mechanizing with the determined value of the error signal $\epsilon_1$ and the value X the equation $$P_p=-2k\int_0^t X\epsilon_1 dt$$

to obtain the value $P_p$.

5. A device for predicting the pitch angle of a floating deck at a predetermined future time as described in claim 4, wherein $P_{-p}$, $P_{-2p}$, $P_{-3p}$, $P_{-4p}$ and $P_{-5p}$ represent past pitch angles spaced at predetermined intervals, $P_o$ represents the present pitch angle and $P_p$ represents the predicted pitch angle at a future time.

6. A device for predicting the height of a floating deck at a predetermined future time as described in claim 4 wherein $P_{-p}$, $P_{-2p}$, $P_{-3p}$, $P_{-4p}$ and $P_{-5p}$ represent past deck heights spaced at predetermined intervals, $P_o$ represents the present deck height and $P_p$ represents the predicted deck height at a future time.

7. A device for determining the value of $P_p$ of a quantity in a fluctuating system at a future time, which comprises means for obtaining continuously in physical form a number of past values of the quantity spaced at predetermined intervals from the present time, which intervals advance with said present time to maintain constant spaces of time between the advancing present time and the times of said past values respectively, and means responsive to the physical quantities representing said past values as continuous inputs for continuously mechanizing the equations $$[P_{(k+q)p}+P_{(k-q)p}]X+[P_{(k+m)p}+P_{(k-m)p}]Y$$
$$+P_{(k+n)p}+P_{(k-n)p}=0$$
$$[P_{(k'+q)p}+P_{(k'-q)Tp}]X+[P_{(k'+m)p}+P_{(k'-m)p}]Y$$
$$+P_{(k'+n)p}+P_{(k'-n)p}=0$$
$$[P_{(k''+q)p}+P_{(k''-q)Tp}]X+[P_{(k''+m)p}+P_{(k''-m)p}]Y$$
$$+P_{(k''+n)p}+P_{(k''-n)p}=0$$

in which X and Y are functions of the unknown velocities of the simple harmonic motions of which the fluctuating system is assumed to be composed, and $k$, $k'$, $k''$, $q$, $m$, and $n$ are constant multipliers for the prediction time intervals $p$, the quantities X and Y being obtained by mechanizing two of said equations, and said quantities X and Y so obtained being employed in mechanizing the other equation to obtain the quantity $P_p$.

References Cited in the file of this patent

UNITED STATES PATENTS

| | | |
|---|---|---|
| 2,622,799 | Roberts | Dec. 23, 1952 |
| 2,678,163 | Roberts et al. | May 11, 1954 |

OTHER REFERENCES

Interim Report, Smith and Lowden, "A Servo System Operating on Discontinuous Information," published in Great Britain, June 1950. NRL Document 57417.